2 Sheets--Sheet 2.

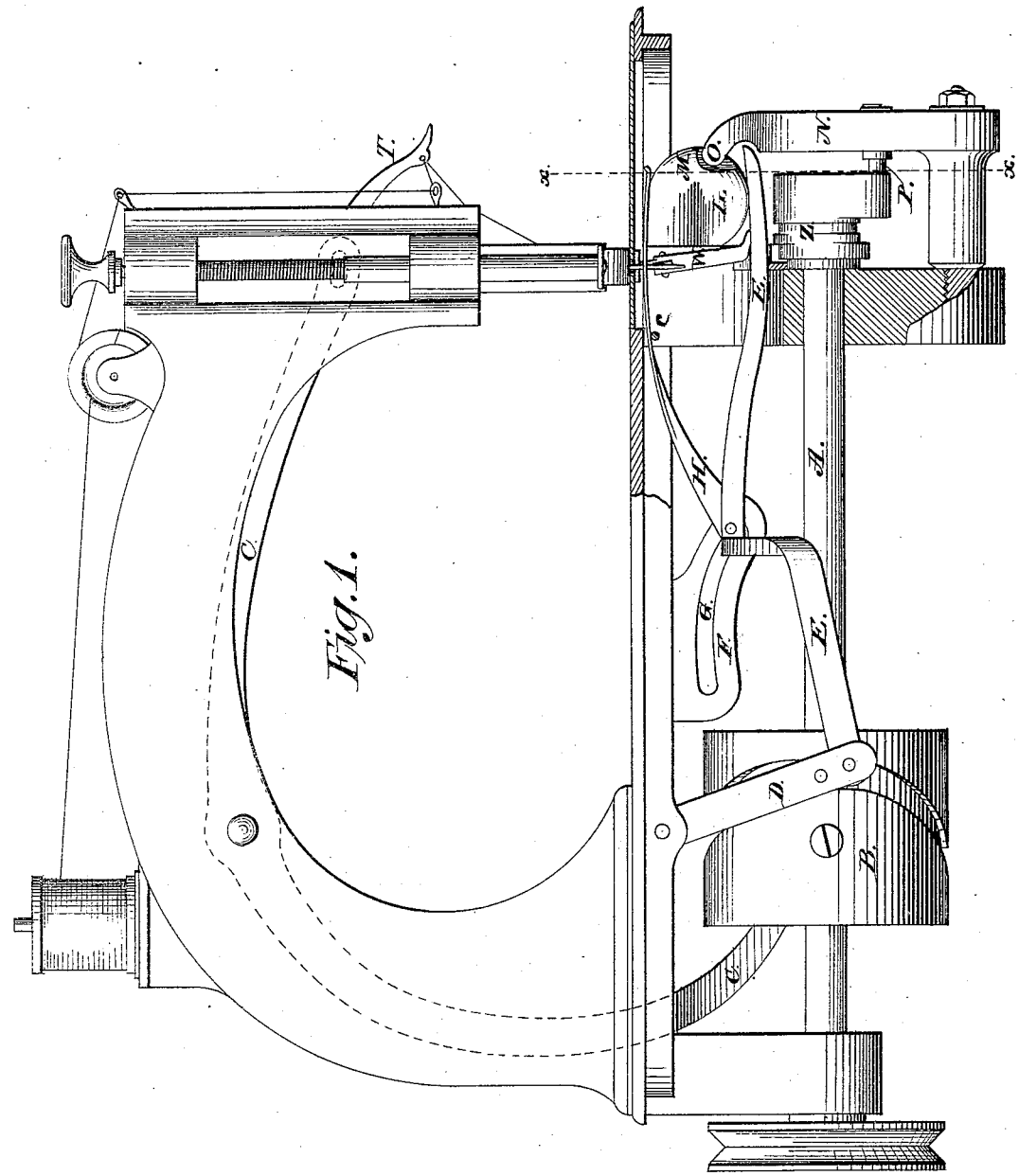

T. A. WEBER.
Sewing-Machines.

No. 153,210. Patented July 21, 1874.

Attest:
Wm H Cheeseman
Wm P Hill

Inventor:
Theodore A. Weber.

UNITED STATES PATENT OFFICE.

THEODORE A. WEBER, OF PHILADELPHIA, PENNSYLVANIA, ASSIGNOR OF TWO-THIRDS HIS RIGHT TO JANE LATHROP, OF NEW YORK, N. Y., AND ALBERT L. RUNYON, OF NEW BRUNSWICK, NEW JERSEY.

IMPROVEMENT IN SEWING-MACHINES.

Specification forming part of Letters Patent No. 153,210, dated July 21, 1874; application filed December 6, 1873.

*To all whom it may concern:*

Be it known that I, THEODORE A. WEBER, of the city and county of Philadelphia and State of Pennsylvania, have invented a new and useful Improvement in Sewing-Machines, of which the following is a specification:

The operation of the sewing-machine on which this improvement is applied being similar to others in common use, as far as the feed, the take-up, and the needle are concerned, renders their description unnecessary. I will therefore only specify my invention, which consists, first, in the combination of a large shuttle or spool-holder, containing a commercial spool of thread, and a two-armed loop-spreading bar, formed and operated in such a manner as to cause said bar to catch the thread from the needle close under its plate, and in connection with a sliding bar to open the needle-loop sufficiently, and hold it long enough for the spool-holder to pass through it free from friction. The second part of my invention consists in the manner of making the chain-stitch by so controlling the loop of needle-thread with a movable hook as to cause the needle in its downward passage to enter said loop sufficiently for the formation of the single chain-stitch, using only the upper spool of thread; or, if the under spool of thread is retained in its place, its end is locked in the chain-stich, forming a combined chain and lock stich. The aforesaid movable hook is so arranged that it may be set in or out of motion or action, as the operator may desire.

Figure 3:
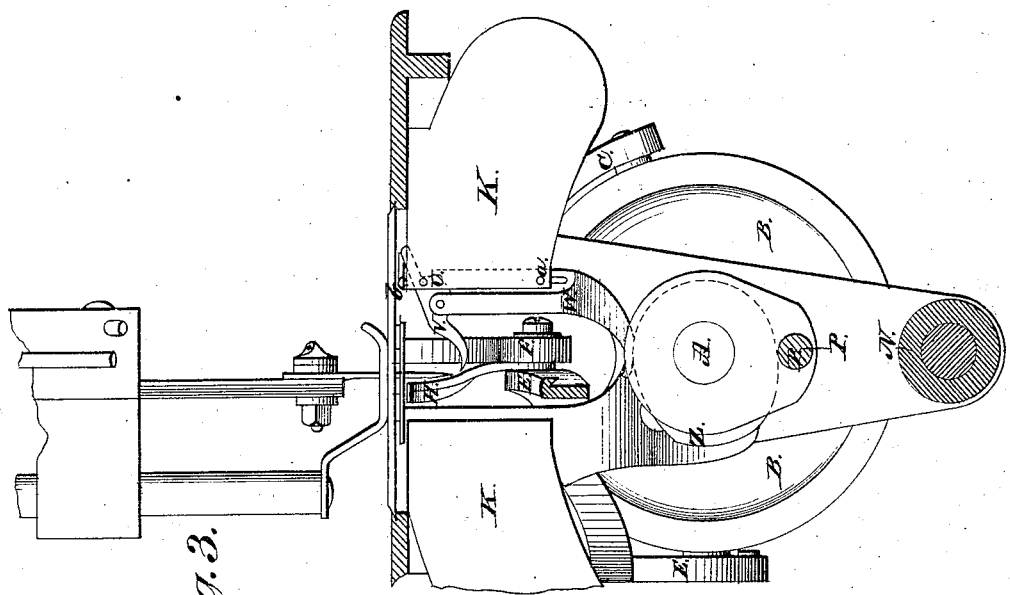
Figure 2:
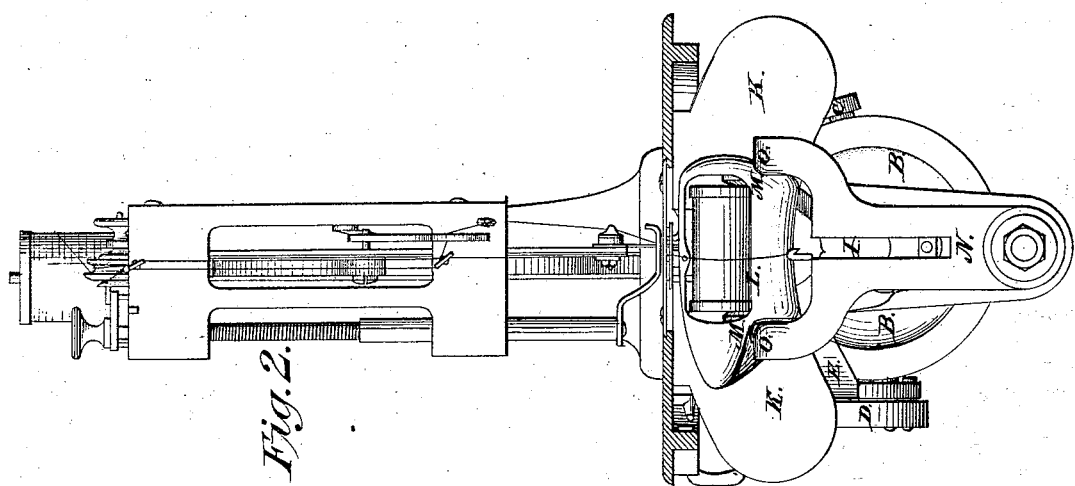

Figure 1 is a side elevation, and partly a longitudinal section, of a machine embodying my invention. Fig. 2 is a front elevation, showing that end of the machine which is at the right hand in Fig. 1. Fig. 3 is a partial cross-section, showing parts of the machine which are at the left hand of the line $x\,x$, drawn across Fig. 1.

A is the driving-shaft, to which cam B is attached, and by its revolution gives motion to the needle-arm C and to the pendulum D. The loop catcher and spreader consists of the bar E, provided at its forward end, Fig. 3, with a hook-like projection next the needle, and of the spring-bar H secured to bar E, and projecting forward close under the bed-plate, and at one side of the needle-arm, just above bar E. The bar E is connected with the pendulous arm D, and through it and the cam B receives its forward movement. The bar H passes through a guiding-loop, $c$, on the under side of the bed-plate, and its forward end is notched. The bar E is moved forward as the needle is delivering its loop below. Its hook catches the loop of needle-thread, and as the bar is moved farther forward the slot G in the hanger or support F throws the point of E downward, away from H and the path of the shuttle, thus drawing out and enlarging the loop. The upper portion of the loop is held in the notch in H, and in this way the loop is held spread for the passage of the large shuttle, and the formation of the lock-stitch in the usual way. The take-up T then draws the slack thread while the bars E H return, the latter yielding the loop gradually to the take-up, thereby preventing the thread kinking. The oscillating shuttle-carrier N is operated by the crank-pin P on shaft A, which enters a slot in it. The spool-holder L rests with its two notches at M M on the two finger-shaped ends O O of the oscillating carrier N, sliding with its overbalancing flat part against the upright surfaces K K, and it is lifted from O O, while the loop is passing, by the loop-catch bar E. These operations form the ordinary lock-stitch, and they are all employed in making the combined chain and lock stitch, with the addition thereto of a hook, V, pivoted to the frame of the machine at U, (shown in Fig. 3,) with its point driven into the returning loop by the link W, which is joined to hook V, guided at pin $a$ and lifted by the eccentric Z. While the point of the hook V is holding the rest of the loop against the needle-plate, close to the needle-hole, the needle is entering it by its downward motion. Then the hook V frees the short loop, and goes in a position as indicated in Fig. 3, to wait for the next returning loop. The same operations serve for the single chain-stitch when the spool-holder L is removed from the machine.

To set the hook V out of action, as required in making the lock-stitch, a little catch, $b$, should be pressed to the right, so as to press the short end of the hook V downward to free the link W from contact with the eccentric Z, holding the point of the hook V constantly against the needle-plate.

I claim as my invention—

1. The combination of the cam B, pendulous arm D, slotted support F, and loop catching and spreading bars E H, with the needle and spool-holder, substantially as and for the purpose set forth.

2. The hook V, link W, and eccentric Z, combined with catch $b$, adapted to throw said hook into or out of action, as and for the purpose set forth.

November 29, 1873.

THEODORE A. WEBER.

Witnesses:
WM. H. CHEESEMAN,
WM. B. HILT.